US012804780B2

(12) United States Patent
Abadia Durango et al.

(10) Patent No.: US 12,804,780 B2
(45) Date of Patent: Nov. 17, 2026

(54) UNDERLAY ARRANGEMENT AND METHOD FOR USING AN UNDERLAY ARRANGEMENT

(71) Applicant: BSH Hausgeräte GmbH, Munich (DE)

(72) Inventors: Jose Antonio Abadia Durango, Saragossa (ES); Tomas Cabeza Gozalo, Saragossa (ES); Pablo Jesus Hernandez Blasco, Saragossa (ES); Javier Lasobras Bernad, Ejea de los Caballeros (ES); Sergio Llorente Gil, Saragossa (ES); Julio Rivera Peman, Cuarte de Huerva (ES)

(73) Assignee: BSH Hausgeräte GmbH, Munich (DE)

( * ) Notice: Subject to any disclaimer, the term of this patent is extended or adjusted under 35 U.S.C. 154(b) by 1096 days.

(21) Appl. No.: 17/911,451

(22) PCT Filed: May 20, 2021

(86) PCT No.: PCT/EP2021/063430
§ 371 (c)(1),
(2) Date: Sep. 14, 2022

(87) PCT Pub. No.: WO2021/239563
PCT Pub. Date: Dec. 2, 2021

(65) Prior Publication Data

US 2023/0108631 A1 Apr. 6, 2023

(30) Foreign Application Priority Data

May 28, 2020 (EP) .................................... 20382455

(51) Int. Cl.
*H05B 6/12* (2006.01)
*A47J 36/34* (2006.01)

(52) U.S. Cl.
CPC ............ *H05B 6/1209* (2013.01); *A47J 36/34* (2013.01)

(58) Field of Classification Search
CPC ............................... H05B 6/1209; A47J 36/34
USPC ......................................................... 219/620
See application file for complete search history.

(56) References Cited

U.S. PATENT DOCUMENTS 3,742,179 A * 6/1973 Harnden, Jr. .......... H05B 6/062 219/622
9,095,005 B2 * 7/2015 Reischmann ........ H05B 6/1209
11,317,478 B2 * 4/2022 Llorente Gil .......... H05B 6/062
2009/0289054 A1 * 11/2009 Williams ............. H05B 6/1209 29/729

(Continued)

FOREIGN PATENT DOCUMENTS

EP 3383134 A1 10/2018
EP 3490340 A1 5/2019

(Continued)

OTHER PUBLICATIONS

International Search Report PCT/EP2021/063430 dated Jul. 13, 2021.

*Primary Examiner* — Jimmy Chou
(74) *Attorney, Agent, or Firm* — Michael E. Tschupp; Andre Pallapies; Brandon G. Braun

(57) ABSTRACT

An underlay apparatus for use with a hob includes an underlay unit positioned between a cooking vessel and a cooking zone of the hob, and a positioning aid supporting the positioning of the underlay unit relative to the cooking zone.

16 Claims, 2 Drawing Sheets

(56) References Cited

U.S. PATENT DOCUMENTS

| | | | | |
|---|---|---|---|---|
| 2010/0116804 | A1* | 5/2010 | Lee | A61F 7/007 219/201 |
| 2012/0118874 | A1* | 5/2012 | Williams | H05B 6/1209 219/635 |
| 2013/0105468 | A1* | 5/2013 | Reischmann | A23L 5/10 219/622 |
| 2013/0186609 | A1* | 7/2013 | Tsai | H05B 6/1209 165/185 |
| 2014/0203010 | A1* | 7/2014 | Alet Vidal | H05B 6/1209 99/348 |
| 2015/0049785 | A1 | 2/2015 | Burkhardt | |
| 2015/0382407 | A1* | 12/2015 | Reischmann | H05B 6/1209 219/622 |
| 2016/0073451 | A1* | 3/2016 | Reischmann | H05B 6/062 219/660 |
| 2017/0064775 | A1* | 3/2017 | Richardson | H05B 6/062 |
| 2017/0280514 | A1* | 9/2017 | Kim | H05B 6/1218 |
| 2018/0110364 | A1 | 4/2018 | Nam | |
| 2018/0352613 | A1* | 12/2018 | Llorente Gil | A47J 36/32 |
| 2019/0008189 | A1* | 1/2019 | Reischmann | A47J 27/00 |
| 2020/0196396 | A1* | 6/2020 | Lasobras Bernad | H05B 6/1218 |
| 2020/0205240 | A1* | 6/2020 | Lee | H05K 9/0022 |
| 2020/0345172 | A1 | 11/2020 | Toncelli | |

FOREIGN PATENT DOCUMENTS

| | | | | |
|---|---|---|---|---|
| KR | 101597173 | B1 * | 2/2016 | H05B 1/0258 |
| WO | WO-2017026646 | A1 * | 2/2017 | H05B 6/1209 |
| WO | WO-2020034011 | A1 * | 2/2020 | H05B 6/1209 |

* cited by examiner

UNDERLAY ARRANGEMENT AND METHOD FOR USING AN UNDERLAY ARRANGEMENT

CROSS-REFERENCES TO RELATED APPLICATIONS

This application is the U.S. National Stage of International Application No. PCT/EP2021/063430, filed May 20, 2021, which designated the United States and has been published as International Publication No. WO 2021/239563 A1 and which claims the priority of European Patent Application, Serial No. 20382455.2, filed May 28, 2020, pursuant to 35 U.S.C. 119 (a)-(d).

The contents of International Application No. PCT/EP2021/063430 and European Patent Application, Serial No. 20382455.2 are incorporated herein by reference in their entireties as if fully set forth herein.

BACKGROUND OF THE INVENTION

The invention relates to an underlay apparatus for use with a hob and a method for using an underlay apparatus with a hob.

For supporting the positioning of cooking vessels relative to the cooking zones of hobs, it is known from the prior art to equip hob plates and/or worktops with markings, for example engravings, which represent the cooking zones. This has the drawback, however, that a freedom of design of the worktop is limited, in particular in the case of hobs which have no hob plates and in which the cooking vessel is directly positioned on a worktop. Moreover, production and assembly tolerances of the heating units of the hob may lead to a faulty positioning of the cooking vessels in spite of the markings, since it is not possible to ensure an accurate overlap of the cooking zones and markings.

BRIEF SUMMARY OF THE INVENTION

The object of the invention consists, in particular without being limited thereto, in providing a generic apparatus with improved properties regarding user comfort.

The invention is based on an underlay apparatus for use with a hob, in particular with an induction hob, comprising an underlay unit which is provided for positioning between a cooking vessel and a cooking zone of the hob.

It is proposed that the underlay apparatus has a positioning aid which is provided for supporting a positioning of the underlay unit relative to the cooking zone.

In particular, a freedom of design of a worktop and/or a hob plate may be increased by such an embodiment. Advantageously, it is possible to dispense with equipping the worktop and/or the hob plate with markings for supporting the positioning of the underlay unit relative to the cooking zone. Moreover, a simple and easily replaceable construction of the positioning aid may be achieved. Advantageously, in the case of damage to the positioning aid, it is possible to avoid dismantling the worktop and/or hob plate. Particularly advantageously, the same underlay apparatus may be used with different hobs in order to ensure a correct positioning of the cooking vessels in each case. Preferably, a high level of accuracy in the production and assembly of the hob and the worktop may be dispensed with, since an accurate overlap of the markings of the worktop and/or the hob plate and the cooking zones of the hob is not required.

An "underlay apparatus" is intended to be understood to mean, in particular, an apparatus which is provided for locating, advantageously for positioning, on a worktop and/or hob plate and for placing at least one cooking vessel and which, in particular in a heating operating state, at least partially forms an underlay for the heated cooking vessel. Preferably, the underlay apparatus is of plate-shaped configuration. A unit being "plate-shaped" is intended to be understood to mean, in particular, that the unit has a thickness which is a maximum of 50%, in particular a maximum of 20%, advantageously a maximum of 10%, preferably a maximum of 5%, of a length and/or a width of the unit. Preferably, the underlay apparatus has at least one, preferably at least two, in particular opposing sides which have a planar, in particular smooth, surface. It might be conceivable that the underlay apparatus is configured to be brittle. Advantageously, the underlay apparatus is configured to be flexible. A unit being "flexible" is intended to be understood to mean, in particular, that the unit may be bent, in particular may be folded and/or kinked, without being destroyed.

Furthermore, advantageously the underlay unit, and particularly advantageously the entire underlay apparatus, has a temperature resistance of at least 300° C. A "temperature resistance" of a unit and/or an element and/or a material is intended to be understood to mean, in particular, an element-specific and/or material-specific maximum and/or minimum temperature to which the unit and/or the element and/or the material may be subjected, in particular permanently and directly, without the properties of the unit and/or element and/or material, which are important for the functionality of the unit and/or the element and/or the material for fulfilling an intended function, being changed thereby beyond a tolerable level for the intended application and/or function of the unit and/or the element and/or the material. In particular, the unit and/or the element and/or the material is functional and/or unimpaired and/or undamaged at the temperature which defines the temperature resistance of the unit and/or the element and/or the material. Preferably, at least the underlay unit and advantageously the entire underlay apparatus is thermally insulating. A unit being "thermally insulating" is intended to be understood to mean, in particular, that the unit at 0° C. has a thermal conductivity of, in particular, at most 10 W/m*k and advantageously at most 1 W/m*k. For example, the underlay apparatus could comprise wood and/or cork and preferably a high-temperature polymer, in particular a high-temperature silicone, and preferably the underlay apparatus consists to a large part of wood or cork and preferably to a large part of the high-temperature polymer, in particular the high-temperature silicone.

Preferably, the underlay apparatus has at least one electronic unit. An "electronic unit" is intended to be understood to mean, in particular, a unit which has at least one electrical and/or electronic component and/or which has at least one electrical and/or electronic unit. The electrical and/or electronic component could be, for example, an electrical resistance component and/or a transmitter and/or a sensor and/or a receiver and/or a coil and/or a diode and/or a capacitor. The electrical and/or electronic unit could be, for example, an operating unit and/or a control unit and/or a communication unit. Particularly preferably, the underlay apparatus has an overhanging portion which in an operating state is configured to be free of the located cooking vessels and, in particular, is configured integrally with the underlay unit. "Integrally" is intended to be understood to mean, in particular, connected at least by a material connection, for example by a welding process, an adhesive bonding process, an injection-molding process and/or another process appearing expedient to the person skilled in the art and/or advantageously formed in one piece such as, for example, by a production from a casting and/or by a production in a single-component or multi-component injection-molding method and advantageously from a single blank. Alternatively, the functional unit and the overhanging portion could be connected together via a plug connection and/or screw connection and/or snap connection. For example, the overhanging portion could have a display unit, in particular for a temperature display and/or a control panel for operating the electronic unit and/or a handle element for gripping the underlay apparatus.

A "hob" is intended to be understood to mean, in particular, a unit which has at least one heating unit and a supply unit and a hob control unit which is provided, in particular, to activate the supply unit in the heating operating state, in particular for supplying the heating unit with energy, in particular with electrical energy, wherein in the heating operating state as a function of a supply by the supply unit the heating unit is provided, in particular, for providing energy, in particular electromagnetic energy, to at least one cooking vessel, in particular to the cooking vessel. It might be conceivable that the hob has a hob plate and may be mounted in a recess of the worktop. Preferably, the hob is free of hob plates. Particularly preferably, the hob has a housing unit, the hob being able to be mounted thereby on a lower face of the worktop. In particular, the underlay apparatus is configured as a separate unit, whereby in particular a high level of flexibility may be achieved. In particular, the underlay unit of the underlay apparatus, which is configured as a separate unit, may be positioned at any position on the worktop and/or hob plate. The underlay apparatus is, in particular, different from the hob and advantageously movable relative to the hob. In particular, the underlay apparatus is provided for use with the hob and preferably with different hobs. The hob is provided, in particular, for use with at least one underlay apparatus and advantageously at least substantially at the same time with at least two, advantageously with at least three, and preferably with at least four, underlay apparatuses. A "heating unit" is intended to be understood to mean, in particular, in this context a unit which is provided to convert energy, preferably electrical energy, into heat and in particular to supply it to at least one cooking vessel. Advantageously, the heating unit is configured as an induction heating unit.

For example, the underlay unit could have a substantially n-sided, such as for example a square and/or rectangular and/or oval, such as for example an elliptical, shape. Advantageously, the underlay unit has a shape which is at least substantially circular and/or disk-shaped. In particular, the underlay unit has a diameter ranging from 120 mm to 320 mm, in particular from 140 to 280 mm, advantageously from 160 mm to 240 mm and preferably from 180 mm to 210 mm. In particular, the underlay unit has a thickness ranging from 0.5 mm to 3.5 mm, in particular from 1 mm to 3 mm, advantageously from 1.5 mm to 2.5 mm and preferably from 1.75 mm to 2.25 mm. In particular, the underlay unit could have at least one recess and advantageously at least one cavity which could be provided, in particular, for receiving at least one part of the electronic unit. The underlay unit is provided, in particular, in the heating operating state to space apart the worktop and/or the hob plate and the heated cooking vessel, in particular, physically from one another. In particular, the underlay unit is provided in the operating state to produce at least substantially a connection between the heated cooking vessel and the worktop and/or hob plate and/or at least to contribute to a connection between the heated cooking vessel and the worktop and/or hob plate. The underlay unit is provided, in particular, for placing different cooking vessels. For example, the underlay unit could be provided for placing cooking vessels which have different sizes and/or different diameters. The underlay unit could be provided, in particular, for placing cooking vessels which have a diameter which is larger, in particular, than a diameter of the underlay unit. The operating state could be arranged, in particular, to be prior to the heating operating state and/or to be at least partially overlapping with the heating operating state. A "heating operating state" is intended to be understood to mean, in particular, a state in which, in particular, a heating of the cooking vessel takes place. In particular, in the heating operating state, a hob arranged below the worktop and/or hob plate provides a heating energy. The hob has, in particular, at least one heating unit which is provided, in particular, to provide the heating energy. The hob has, in particular, a hob control unit which is provided, in particular, to control and/or regulate an energy supply to the heating unit in the heating operating state. In particular, in the heating operating state at least the underlay unit is located on the worktop and/or hob plate. A "hot plate" is intended to be understood to mean, in particular, a unit which in at least one operating state is provided for placing cooking vessels and which, in particular, is provided to configure a part of an external housing, in particular of the hob. The hob plate consists, in particular, at least to a large part of glass and/or glass ceramic. "At least to a large part" is intended to be understood to mean, in particular, to a proportion of at least 70%, in particular of at least 80%, advantageously of at least 90% and preferably of at least 95%. A "worktop" is intended to be understood to mean, in particular, a unit on which, in particular, a preparation and/or a treatment of food takes place and/or which is provided, in particular, for depositing and/or placing at least one utensil, in particular a kitchen utensil. The utensil could be, for example, a cooking vessel and/or a baking tin and/or a bowl and/or kitchen appliance and/or a knife and/or spoon and/or a fork and/or kitchenware and/or bakeware and/or preparation board and/or a kitchen work board, such as for example a cutting board. The worktop could consist, in particular, at least to a large part of laminated material and/or laminate and/or natural stone and/or artificial stone and/or mineral material and/or solid wood and/or real wood and/or ceramic and/or concrete and/or glass.

The positioning aid may be arranged, in particular, on an upper face and/or on a lower face or entirely in an inner region of the underlay unit. Preferably, the underlay unit has a receiver for the positioning aid which could be open or entirely closed toward the upper face and/or lower face. It might be conceivable that the positioning aid is provided to output instructions to a user regarding a predefined position of the underlay unit relative to the cooking zone. Preferably, the predefined position corresponds to a position which ensures an optimal heating of the cooking vessel when a cooking vessel is located on the underlay unit. Preferably, in the predefined position, when viewed perpendicularly to a main extension plane of the underlay unit, a central point of the underlay unit and a central point of the cooking zone are identical to one another. A "main extension plane" of an object is intended to be understood to mean, in particular, a plane which is parallel to a largest side surface of a smallest imaginary geometric cuboid which only just fully encloses the object and, in particular, runs through the central point of the cuboid. For example, the positioning aid could have a receiver and/or a transmitter, in particular an RFID chip and/or Bluetooth chip and/or IR chip, which in the predefined position of the underlay unit outputs an acoustic and/or optical signal to the user relative to the cooking zone.

"Provided" is intended to be understood to mean specifically designed and/or equipped. An object being provided for a specific function is intended to be understood to mean that the object fulfills and/or performs this specific function in at least one use state and/or operating state.

It might be conceivable that the positioning aid is arranged in an edge region of the underlay unit. For example, the positioning aid could be configured as a protruding edge of the underlay unit which is provided to engage in a corresponding depression of the worktop and/or hot plate. In order to simplify a correct positioning of the underlay unit, it is proposed that the positioning aid, in particular when viewed perpendicularly to the main extension plane of the underlay unit, is arranged in a central region of the underlay unit. A "central region" is intended to be understood to mean, in particular, in this context a partial region of a cylinder which only just receives the unit and which, when viewed perpendicularly to a main extension plane of the cylinder, extends in the direction from a central point of the cylinder by at most 20%, advantageously by at most 15% and particularly advantageously by at most 10% of an extension of the cylinder in any direction. Particularly advantageously, the positioning aid is arranged concentrically to the underlay unit. As a result, in particular, a correct positioning of the underlay unit may be achieved by an intuitive arrangement of the central points of the cooking zone and the underlay unit above one another.

It is further proposed that the positioning aid provides a holding force for supporting the positioning in the predefined position of the underlay unit relative to the cooking zone. The positioning aid providing a "holding force" is intended to be understood to mean, in particular, that in the predefined position the positioning aid provides a force which counteracts a displacement of the underlay unit. Preferably, the holding force differs from an adhesive force. It might be conceivable that the positioning aid holds the underlay unit by the holding force unreleasably in the predefined position or in a manner which is only releasable by a tool. Preferably, the holding force is able to be overcome manually by a user. In particular, the holding force is a maximum of 10 N and advantageously a maximum of 5 N. As a result, in particular, an even simpler and intuitive positioning of the underlay unit may be achieved. Advantageously, the underlay unit may be simply moved over the worktop and/or the hob plate until the underlay unit is secured by the positioning unit at the predefined position.

It might be possible for the holding force to be configured as a frictional force. In order to simplify a construction of the underlay unit, it is proposed that the positioning aid has at least one magnetic holding element, in particular a ferrimagnetic or ferromagnetic holding element, which is provided for providing the holding force. For example, the holding element could be configured as a ferrite, in particular a strontium ferrite or a barium ferrite. In particular, the positioning aid may have any number of holding elements which may be configured, in particular, differently from one another and preferably together form a holding unit for providing the holding force. Advantageously, the holding element has a Curie temperature of at least 300° C., particular advantageously at least 400° C. and preferably at least 500° C. As a result, in particular, an equipping of the underlay unit with edges or projections for providing the holding force may be dispensed with. Advantageously, the positioning aid may be used irrespective of a size of the cooking zone.

Advantageously, the holding element is configured as a permanent magnet, in particular a SmCo magnet. As a result, in particular, the holding force may be increased. Advantageously, a heat-resistant positioning aid may be provided. Alternatively, the holding element could also be configured as an AlNiCo magnet.

It is further proposed that the underlay apparatus has a shielding element which is arranged between the positioning aid and a cooking vessel support surface of the underlay unit and is provided to shield the positioning aid electromagnetically. The shielding element "electromagnetically shielding" the positioning aid is to be understood to mean, in particular, in this context that the shielding element prevents objects arranged above the cooking vessel support surface, in particular the cooking vessel, from being influenced by an electromagnetic field of the positioning aid. The shielding element could comprise, for example, a Mu-metal or a ferrite. As a result, in particular, a user comfort may be further increased. Advantageously, an adhesion of the underlay unit to the cooking vessels may be avoided.

Moreover, a system comprising the underlay apparatus and comprising the hob is proposed. As a result, a positioning of cooking vessels on the hob may be supported in a simple and intuitive manner. Advantageously, it is possible to prevent the production and assembly tolerances of the hob influencing an accuracy of the positioning of the underlay unit.

Additionally, it is proposed that the hob has a further positioning aid which is provided, together with the positioning aid, to provide the support of the positioning of the underlay unit relative to the cooking zone. The further positioning aid may have, for example, a receiver and/or transmitter, in particular an RFID chip and/or Bluetooth chip and/or IR chip. Preferably, the further positioning aid has a further holding element corresponding to the holding element of the positioning aid. For example, the further holding element could be configured identically to the holding element. Advantageously, the holding element and the further holding element are configured as permanent magnets. Alternatively, the holding element could be configured differently from the further holding element. In particular, one of the holding elements could be configured as a ferrite and another of the holding elements could be configured as a permanent magnet. Preferably, the holding element provides the holding force at a distance between the holding element and the further holding element of up to 4 mm, advantageously of up to 6 mm and particularly advantageously of up to 8 mm. In particular, the distance up to which the holding element provides the holding force is adapted to a thickness of the worktop and/or hob plate, for example a size and/or position and/or magnetic strength of the holding element and/or the further holding element could be different depending on the field of application. In particular, a hob may have a plurality of different further positioning aids which, for example, could be assigned to differently sized cooking zones and correspond to different positioning aids. As a result, in particular, a simple use of the underlay apparatus may be achieved. Advantageously, an additional assembly of the further positioning aid on the hob may be dispensed with.

It might be conceivable that the further positioning aid could be configured as a coating of a lower face of the worktop and/or the hob plate. In order to achieve a simple design and arrangement of the further positioning aid, it is proposed that the hob has a heating unit, wherein the further positioning aid, in particular when viewed perpendicularly to a main extension plane of the heating unit, is arranged in a central region of the heating unit. In particular, the heating unit is assigned to the cooking zone. It might be conceivable that the heating unit is configured as a radiation heating unit. Preferably, the heating unit is configured as a heating inductor. For example, the heating unit, when viewed perpendicularly, could have an oval, in particular circular, or a rectangular, in particular square, shape. Preferably, the further positioning aid, when viewed perpendicularly, is entirely surrounded by the heating unit. As a result, in particular, an effective use may be achieved of the empty spaces of the heating unit which are present. It might be conceivable that the cooking zone is assigned a plurality of heating units, wherein the further positioning aid, when viewed perpendicularly, could be arranged in a common central point of all of the heating units assigned to the cooking zone.

It is further proposed that the system has the worktop which is configured, in particular, as a kitchen worktop which is arranged above the hob in a mounted state. As a result, in particular, a user comfort may be increased. Advantageously, the worktop may be selectively used for cutting and/or mixing and/or stirring and heating food to be cooked.

Advantageously, the worktop is free of markings identifying the cooking zone. As a result, in particular, a freedom of design of the worktop may be increased.

The invention is also based on a method for using an underlay apparatus, in particular the underlay apparatus for use with a hob, wherein the underlay apparatus has an underlay unit which is positioned between a cooking vessel and a cooking zone of the hob.

It is proposed that a positioning of the underlay unit relative to the cooking zone is supported by the positioning aid. As a result, a user comfort may be increased. Advantageously, a positioning of the underlay unit may be supported in a simple and intuitive manner.

The underlay apparatus in this case is not intended to be limited to the above use and embodiment. In particular, for fulfilling a mode of operation described herein, the underlay apparatus may have a number of individual elements, components and units which differs from a number cited herein.

Further advantages emerge from the following description of the drawings. Two exemplary embodiments of the invention are shown in the drawings. The drawings, the description and the claims contain numerous features in combination. The person skilled in the art will also expediently consider the features individually and combine them to form further meaningful combinations.

DETAILED DESCRIPTION OF EXEMPLARY EMBODIMENTS OF THE PRESENT INVENTION

Figure 1:
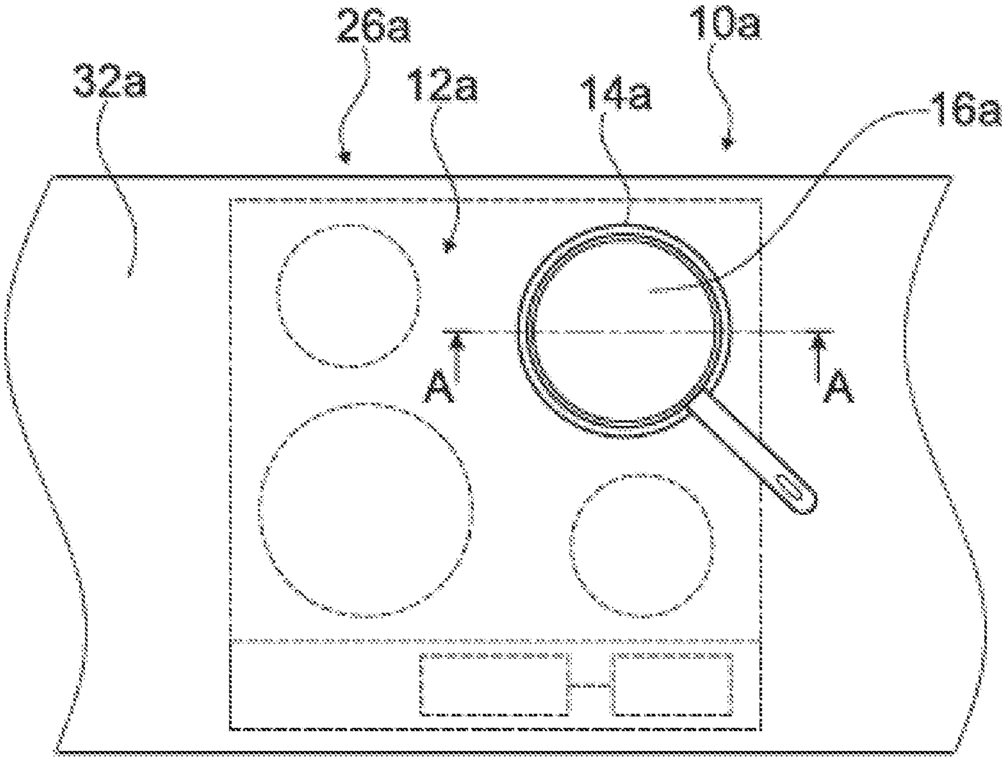
FIG. 1 shows a view of a system with an underlay apparatus and a hob from above.

Of the objects repeatedly present in the figures, in each case only one is provided with a reference character.

FIG. 1 shows a system 26*a*. The system 26*a* has a hob 12*a*. The hob 12*a* is configured as an induction hob. The hob 12*a* has a heating unit 28*a* which is shown in more detail in FIG. 2. The heating unit 28*a* is configured as a heating inductor. The hob 12*a* has a cooking zone. The cooking zone is defined by the heating unit 28*a*. The cooking zone corresponds to a region above the heating unit 28*a*. The system 26*a* has a worktop 32*a*. The worktop 32*a* is configured as a kitchen worktop. The worktop 32*a* is arranged above the hob 12*a*. The hob 12*a* is mounted on a lower face of the worktop 32*a*. Alternatively, the hob 12*a* could have a hob plate and could be mounted in a recess of the worktop 32*a*. The worktop 32*a* is free of markings identifying the cooking zone.

Figure 2:
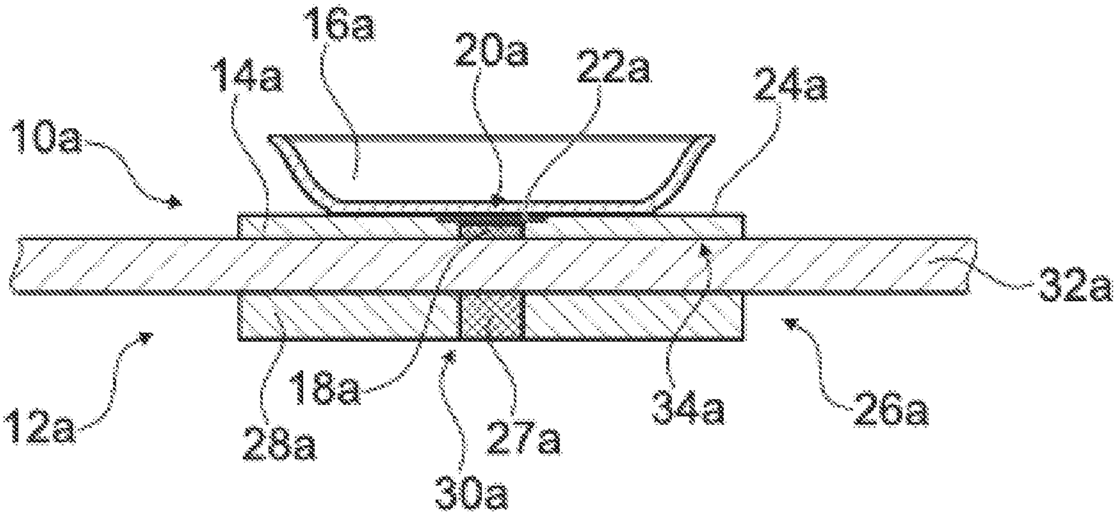
FIG. 2 shows a sectional view of the system along the cutting line A-A in FIG. 1.

The system 26*a* has an underlay apparatus 10*a* which is shown in more detail in FIG. 2. The underlay apparatus 10*a* serves for use with the hob 12*a*. The underlay apparatus 10*a* is of plate-shaped configuration. The underlay apparatus 10*a* comprises a high-temperature silicone. Alternatively or additionally, the underlay apparatus 10*a* could comprise wood and/or cork. The underlay apparatus 10*a* has an underlay unit 14*a*. The underlay unit 14*a* entirely forms an outer contour of the underlay apparatus 10*a*. Alternatively, the underlay apparatus 10*a* could have further units, in particular overhanging portions, which could be connected integrally to the underlay unit 14*a*. The underlay unit 14*a* is configured to be circular disk-shaped. Alternatively, the underlay unit 14*a* could have any other shape, in particular a rectangular disk shape, in particular a square disk shape. The underlay unit 14*a* is provided for positioning between a cooking vessel 16*a* and the cooking zone of the hob 12*a*. The underlay unit 14*a* has a cooking vessel support surface 24*a*. The cooking vessel 16*a* is positioned on the cooking vessel support surface 24*a*.

The underlay apparatus 10*a* has a positioning aid 18*a*. The positioning aid 18*a* serves for facilitating positioning of the underlay unit 14*a* relative to the cooking zone. The positioning aid 18*a* is arranged in a central region 20*a* of the underlay unit 14*a*. The positioning aid 18*a* is arranged concentrically to the underlay unit 14*a*. The positioning aid 18*a* is configured to be circular disk-shaped. Alternatively, the positioning aid 18*a* could have any other shape, for example a rectangular disk shape, in particular a square disk shape. The positioning aid 18*a* is arranged on a lower face 34*a* of the underlay unit 14*a*. The lower face 34*a* is arranged opposite the cooking vessel support surface 24*a*. Alternatively, the positioning aid 18*a* could be arranged entirely in an internal region of the underlay unit 14*a* or on the cooking vessel support surface 24*a* of the underlay unit 14*a*.

The positioning aid 18*a* provides a holding force for facilitates the positioning of the underlay unit 14*a* in a predefined position relative to the cooking zone. Alternatively, in the predefined position the positioning aid 18*a* could output a signal to a user. The predefined position corresponds to a position in which, when viewed perpendicularly to a main extension plane of the underlay unit 14*a*, central points of the underlay unit 14*a* and the cooking zone are identical to one another. The holding force is able to be overcome manually by the user. The holding force is 5 N. The positioning aid 18*a* has a magnetic holding element. The holding element serves for providing the holding force. The holding element entirely forms the positioning aid 18*a*. Alternatively, the positioning aid 18*a* could have a plurality of holding elements. The holding element is configured as a permanent magnet. The holding element is configured as a SmCo magnet.

The underlay apparatus 10*a* has a shielding element 22*a*. The shielding element 22*a* is arranged between the positioning aid 18*a* and the cooking vessel support surface 24*a*. The shielding element 22*a* serves for the electromagnetic shielding of the positioning aid 18*a*. The shielding element 22*a* prevents an adhesion of the underlay unit 14*a* to the cooking vessel 16*a*. The shielding element 22*a* is configured to be plate-shaped. The shielding element 22*a* is configured to be circular disk-shaped. Alternatively, the shielding element 22*a* could have any other shape, for example a rectangular disk shape, in particular a square disk shape. The shielding element 22*a* entirely covers the positioning aid 18*a* when viewed perpendicularly. The shielding element 22*a* comprises a Mu-metal. Alternatively or additionally, the shielding element 22*a* could comprise a ferrite.

The hob 12*a* has a further positioning aid 27*a*. The further positioning aid 27*a*, together with the positioning aid 18*a*, provides support for positioning the underlay unit 14*a* relative to the cooking zone. The further positioning aid 27*a* is configured identically to the positioning aid 18*a*, except for a height. Alternatively, the further positioning aid 27*a* could be configured as a different type of permanent magnet or a ferrite. The further positioning aid 27*a* is arranged in a central region 30*a* of the heating unit 28*a*. The heating unit 28*a* entirely encloses the further positioning aid 27*a*, when viewed perpendicularly to a main extension plane of the heating unit 28*a*.

Figure 3:
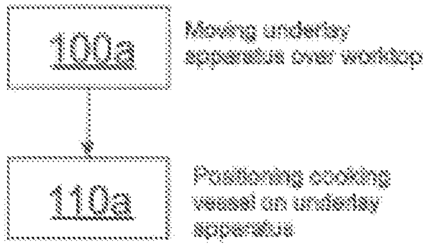
FIG. 3 shows a schematic flow diagram of a method for using the underlay apparatus and FIG. 4 shows a sectional view of a further exemplary embodiment of a system having an underlay apparatus and a hob along a cutting line similar to the cutting line A-A in FIG. 1.

FIG. 3 shows a schematic flow diagram of a method for using the underlay apparatus 10*a*. In a positioning step 100*a*, the underlay apparatus 10*a* is moved over the worktop 32*a* until the underlay apparatus 10*a* arrives in the predefined positon and is secured by the positioning aid 18*a*. In a placement step 110*a*, the cooking vessel 16*a* is positioned on the underlay apparatus 10*a*. The placement step 110*a* follows the positioning step 100*a*. Following the placement step 110*a*, the system 36*a* may be transferred into a heating operating state in which the cooking vessel 16*a* is optimally heated.

Figure 4:
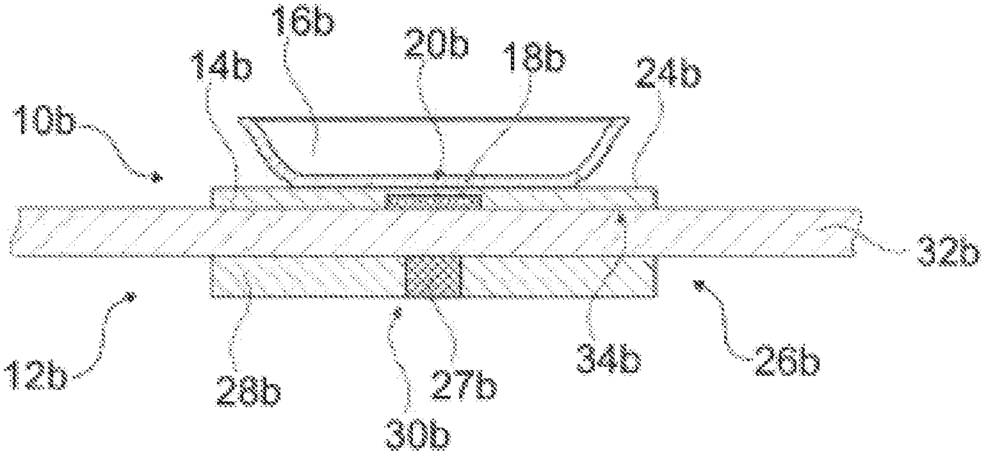

In FIG. 4 a further exemplary embodiment of the invention is shown. The following descriptions are substantially limited to the differences between the exemplary embodiments, wherein relative to components, features and functions remaining the same, reference is made to the description of the exemplary embodiment of FIGS. 1 to 3. To differentiate between the exemplary embodiments, the letter a in the reference characters of the exemplary embodiment in FIGS. 1 to 3 is replaced by the letter b in the reference characters of the exemplary embodiment of FIG. 4. Relative to components denoted the same, in particular relative to components with the same reference characters, in principle reference may also be made to the drawings and/or the description of the exemplary embodiment of FIGS. 1 to 3.

FIG. 4 shows a further exemplary embodiment of a system 26*b*. The system 26*b* is free of shielding elements. The system 26*b* has a positioning aid 18*b*. The positioning aid 18*b* is configured as a ferrite. The system 26*b* has a further positioning aid 27*b*. The further positioning aid 27*b* is configured differently from the positioning aid 18*b*.

The invention claimed is:

1. An underlay apparatus for use with a hob, said underlay apparatus comprising:
- an underlay unit positioned between a cooking vessel and a cooking zone of the hob;
- a positioning aid that facilitates a positioning of the underlay unit relative to the cooking zone; and
- a shielding element arranged between the positioning aid and a cooking vessel support surface of the underlay unit and magnetically shielding the positioning aid;
- wherein the positioning aid is configured to exert a holding force for facilitating the positioning in a predefined position of the underlay unit relative to the cooking zone.

2. The underlay apparatus of claim 1, wherein the positioning aid is arranged in a central region of the underlay unit.

3. The underlay apparatus of claim 1, wherein the positioning aid includes a magnetic holding element for providing the holding force.

4. The underlay apparatus of claim 3, wherein the holding element is configured as a permanent magnet.

5. An underlay apparatus for use with a hob, said underlay apparatus comprising:
- an underlay unit positioned between a cooking vessel and a cooking zone of the hob;
- a positioning aid that facilitates a positioning of the underlay unit relative to the cooking zone; and
- a shielding element arranged between the positioning aid and a cooking vessel support surface of the underlay unit and shielding the positioning aid electromagnetically;
- wherein the positioning aid is configured to exert a holding force for facilitating the positioning in a predefined position of the underlay unit relative to the cooking zone.

6. The underlay apparatus of claim 5, wherein the positioning aid is arranged in a central region of the underlay unit.

7. The underlay apparatus of claim 5, wherein the positioning aid includes a magnetic holding element for providing the holding force.

8. A system, comprising:
- a hob; and
- an underlay apparatus comprising
  - an underlay unit positioned between a cooking vessel and a cooking zone of the hob,
  - a positioning aid that facilitates a positioning of the underlay unit relative to the cooking zone, and
  - a shielding element arranged between the positioning aid and a cooking vessel support surface of the underlay unit and magnetically shielding the positioning aid,
- wherein the positioning aid of the underlay apparatus is configured to exert a holding force for facilitating the positioning in a predefined position of the underlay unit relative to the cooking zone.

9. The system of claim 8, wherein the hob includes a positioning aid which together with the positioning aid of the underlay apparatus facilitates the positioning of the underlay unit relative to the cooking zone.

10. The system of claim 9, wherein the hob includes a heating unit, said positioning aid of the hob being arranged in a central region of the heating unit.

11. The system of claim 8, further comprising a worktop arranged above the hob in a mounted state.

12. The system of claim 11, wherein the worktop is free of markings identifying the cooking zone.

13. The system of claim 8, wherein the positioning aid of the underlay apparatus is arranged in a central region of the underlay unit.

14. The system of claim 8, wherein the positioning aid of the underlay apparatus includes a magnetic holding element for providing the holding force.

15. The system of claim 14, wherein the holding element is configured as a permanent magnet.

16. The system of claim 8, wherein the shielding element shields the positioning aid electromagnetically.

* * * * *